(12) United States Patent
Schleipen et al.

(10) Patent No.: US 6,243,203 B1
(45) Date of Patent: Jun. 5, 2001

(54) OPTICAL SYSTEM WITH ANTI-REFLECTION COATING

(75) Inventors: Johannes J. H. B. Schleipen; Godert W. R. Leibbrandt, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/174,219

(22) Filed: Oct. 16, 1998

(30) Foreign Application Priority Data

Apr. 24, 1998 (EP) .................................................. 98201322

(51) Int. Cl.⁷ .............................. G02B 1/10; G02B 5/28; G02B 5/08; F21V 9/04
(52) U.S. Cl. ......................... 359/581; 359/580; 359/588; 359/589; 359/359
(58) Field of Search .................................... 359/580, 584, 359/586, 587, 588, 589, 581, 359, 361, 350; 250/583

(56) References Cited

U.S. PATENT DOCUMENTS

| | | | |
|---|---|---|---|
| 4,778,275 | 10/1988 | Van Den Brink et al. | 356/401 |
| 5,780,857 * | 7/1998 | Harju et al. | 250/583 |
| 5,885,712 * | 3/1999 | Otani et al. | 428/426 |
| 5,963,365 * | 10/1999 | Shiral | 359/359 |
| 6,030,717 * | 2/2000 | Nakamura et al. | 359/586 |

FOREIGN PATENT DOCUMENTS

| | | | |
|---|---|---|---|
| 0770895A2 | 5/1997 | (EP) | G02B/13/14 |
| 08271807A | 10/1996 | (JP) | G02B/23/26 |
| 10160906A | 6/1998 | (JP) | G02B/3/00 |

OTHER PUBLICATIONS

S.M. Mansfield, W.R. Studenmund, G.S. Kino and K.Osato, "High–Numerical Aperture Lens System for Optical Storage", Feb. 15, 1993, vol. 18, No. 4, Optics Letters, pp. 305–307.

* cited by examiner

Primary Examiner—Audrey Chang
(74) Attorney, Agent, or Firm—Michael E. Belk

(57) ABSTRACT

In an optical system, like a lens system, having at least one transition from a first medium to a second medium, a newly designed coating, for example, an anti-reflection coating is applied. The coating is composed of a number of sub-coatings (25, 30, 35, 40, 45, 50), each of which is optimized for a different angle of incidence. With this coating, the intensity of a beam passing through a high numerical optical system can be kept constant.

13 Claims, 5 Drawing Sheets

OPTICAL SYSTEM WITH ANTI-REFLECTION COATING

FIELD OF THE INVENTION

The invention relates to an optical system for guiding a beam of electromagnetic radiation, which system has at least one transition from a first medium to a second medium.

The invention also relates to an optical device in which such an optical system is used, such as an optical scanning device or a lithographic projection apparatus.

BACKGROUND OF THE INVENTION

The optical system may be a lens system comprising one, a plurality, or a large number of lens elements in which each lens surface constitutes said transition, namely the transition between the lens material, for example glass or a synthetic material, and the medium surrounding the lens, for example air. The optical system may alternatively comprise components other than lens elements, such as a beam splitter, a birefringent plate and the like.

It is common practice to provide an optical coating, or cladding, such as an anti-reflection coating on the transitions so as to prevent unwanted reflections from occurring at said transitions. Not only do such reflections reduce the transmission through these transitions, but also the reflected radiation may reach unwanted positions in the relevant optical apparatus where it may cause troublesome effects.

An optical apparatus which has become very popular and is currently manufactured in large numbers is the playback apparatus for an optical record carrier in which an audio program is stored, which apparatus is known as CD player. This apparatus comprises, inter alia, an objective lens, preferably in the form of a single lens element having one or two aspherical surfaces with which a scanning beam from a diode laser is focused to form a scanning spot with a diameter of the order of 1 µm on the information plane of the record. For novel uses of optical record carriers, for example as a storage medium for a digital audio program and for a video program or film, either or not in a digital form, the information contents of such a record carrier must be increased considerably, so that, with the same dimension of the record carrier, the information density must be increased considerably. This means that the information elements, for example in the form of pits in the information layer in which the information is stored in an encoded form, must be reduced considerably. To be able to read the smaller information elements separately, the scanning spot must also be reduced. The size of the scanning spot is proportional to λ/NA, in which λ is the wavelength of the scanning beam and NA is the numerical aperture of the objective system. It has therefore been proposed to use a scanning beam having a smaller wavelength, for example 650 nm instead of the customary 860 or 780 nm and to increase the numerical aperture of the objective system.

The article "High-numerical-aperture lens systems for optical recording" in Optics Letters, vol. 18, no. 4, Feb. 15, 1993, pp. 305–307 describes how the numerical aperture can be increased considerably in a scanning device for optical record carriers, namely by providing a plano-convex lens between the customary objective lens and the record carrier, with the flat side of this lens facing the record carrier. This plano-convex lens is also referred to as SIL (solid immersion lens) in analogy with the immersion lens used in microscopes. An NA of 0.85 can be realized with the combination of the objective lens and the plano-convex lens.

SUMMARY OF THE INVENTION

However, it has been found that, when using such an optical system with a high numerical aperture, the scanning beam no longer has a uniform intensity distribution after it has passed the lens combination, so that the scanning spot formed by this beam no longer has the desired quality. Consequently, the read signal will have a considerably reduced quality.

It is an object of the present invention to provide an optical system with a high numerical aperture for, inter alia, a scanning device for optical record carriers which does not affect the intensity distribution of a beam passing therethrough. This optical system is characterized in that an anti-reflection coating provided at the area of said transition comprises at least two sub-coatings which are maximally anti-reflective for different angles of incidence.

The invention is based on the recognition that, at larger numerical apertures, the border rays of the beam are incident on the lens surface and on the anti-reflection coating provided on this surface at such a large angle, for example, larger than 40°, to the normal on the lens surface that a standard coating loses its effect for these rays. Consequently, the transmission of the relevant lens element will be dependent on the distance to the optical axis; the transmission will be smaller as the distance to the optical axis increases. According to the invention, this new problem is solved by using a combination of a number of sub-coatings each of which is optimized for a different angle of incidence, instead of a standard coating which is optimized for an angle of incidence of 0°. Such a composite coating maintains the desired effect for a great spread of angles of incidence such as occurs at a high numerical aperture.

In principle, a sub-coating in the optical system may consist of a single layer whose product of the thickness and the refractive index has a given value. The optical system is preferably further characterized in that each sub-coating consists of at least two layers of a different material.

Similarly as a sub-coating consisting of a single layer, a sub-coating consisting of two layers has a reflection of 0% for the angle for which it is designed, hereinafter referred to as design angle, but it has also a small reflection, for example of less than 1% for a small range of angles of incidence around the design angle. Instead of subcoatings consisting of two layers, sub-coatings consisting of three or more layers may be used. A coating consisting of three layers has a small reflection through a wider range of angles of incidence, while the reflection for the design angle is slightly larger than zero percent.

A practical embodiment of the optical system suitable for a numerical aperture of the order of 0.85 is further characterized in that the coating comprises a stack of seven two-layer sub-coatings each consisting of two layers of a different material, which subcoatings are maximally anti-reflective for angles of incidence of 0°, 15°, 30°, 40°, 45°, 50° and 55°, respectively.

With this number of sub-coatings and the limited total number of layers, and the choice of the angles of incidence for which the sub-coatings are optimized, an optical system having said numerical aperture can be realized which has a substantially uniform transmission.

Instead of the coating comprising only sub-coatings with an equal number of layers, the optical system may be characterized in that the coating comprises a combination of two-layer sub-coatings and three-layer sub-coatings each consisting of three layers of a different material.

Such a coating combines the advantages of two-layer sub-coatings and three-layer sub-coatings.

The two-layer and three-layer sub-coatings may be arranged in different ways. A preferred embodiment of the optical system with such a coating is further characterized in that the coating comprises a first stack of two-layer sub-coatings and a second stack of three-layer sub-coatings.

An attractive embodiment of the optical system with this coating is characterized in that the first and the second stack each comprise eight sub-coatings each, which are maximally anti-reflective for angles of incidence of 0°, 10°, 20°, 30°, 40°, 50°, 55° and 60°, respectively.

The invention may be used in different types of optical systems. A first use is an optical system in the form of a lens system comprising at least one lens element, the two lens surfaces of which each constitute said transition. Such a lens system is then characterized in that the lens surfaces are provided with said coating.

The lens system may alternatively comprise a number of lens elements ranging between two and a large number of such elements, with coatings according to the invention being provided on those lens surfaces where a beam passing through the lens system has a large aperture angle.

The lens system may form part of a larger optical system in which also components other than lens elements may be arranged, such as a beam splitter which is generally arranged at an angle of 45° to the chief ray of the beam and on which rays may be incident at very different angles of incidence, or a birefringent plate, for example in the form of a $\lambda/4$ plate. Coatings according to the invention may also be provided on these elements. The use of the invention is not limited to these elements in combination with lens elements, but also comprises these lens elements as sole elements or as elements which are combined with optical systems other than lens systems.

A special lens system is a lithographic projection lens which comprises a large number of lens elements and should preferably have a maximal numerical aperture so as to be able to image minimal details of a mask pattern, for example an IC pattern.

Another special lens system is the above-mentioned combination of an objective lens and a plano-convex lens whose convex surface faces the objective lens. This combination may be used in a reading device for optical record carriers, but also in, for example an optical microscope.

The invention also relates to a lithographic projection apparatus comprising a UV radiation source for supplying a projection beam, a mask holder for supporting a mask to be projected, a substrate holder for supporting a substrate on which the mask is to be projected, and a projection system arranged between the mask holder and the substrate holder. This apparatus is characterized in that the projection system is an optical system as described hereinbefore.

The invention further relates to an optical scanning device for scanning an optical record carrier having an information plane and a transparent substrate, which device comprises a radiation source for supplying a scanning beam, and a lens system for converging the scanning beam through the substrate to form a scanning spot on the information layer. This scanning device is characterized in that the lens system is constituted by said combination of an objective and a plano-convex lens, with the flat side of the plano-convex lens facing the substrate.

These and other aspects of the invention are apparent from and will be elucidated with reference to the embodiments described hereinafter.

DETAILED DESCRIPTION OF PREFERRED EMBODIMENTS

Figure 1:
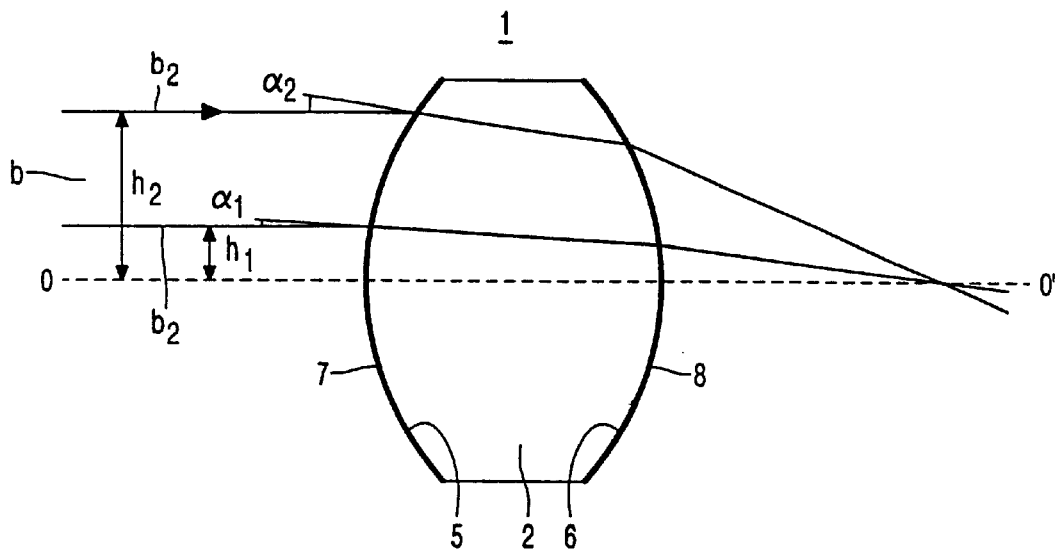
FIG. 1 shows the different angles of incidence on the surfaces of a lens element within a beam.

FIG. 1 shows a lens element 1 which may form part of a lens system or another optical system on which a radiation beam b is incident. The lens element consists of a lens body 2 of glass or a transparent synthetic material, whose surfaces 5 and 6 are provided with anti-reflection coatings 7 and 8. Two rays $b_1$ and $b_2$ of the beam b having different distances $h_1$ and $h_2$ to the optical axis OO' are shown. Due to these different distances and the curvature of the lens surface 5, the angles of incidence $\alpha_1$, and $\alpha_2$ at which these rays are incident on the lens surface, hence on the anti-reflection coating 7, are different. As the distance to the optical axis increases, the angle of incidence also increases.

The simplest anti-reflection coating for the lens surfaces is a one-layer coating consisting of a single layer of material having a given refractive index n and a given thickness d, such that the optical thickness $D=n\times d$ is exactly one quarter of the wavelength of the incident radiation beam b. By providing an anti-reflection coating, two transitions are produced, namely a first transition of air or another surrounding medium to the material of the anti-reflection coating, and a second transition of this material to the lens material. When radiation is reflected, part of it originates from the first transition and the rest originates from the second transition. If the optical thickness of the anti-reflection coating, hence the distance between the transitions, is a quarter wavelength, then the reflected radiation originating from the second transition is exactly 180° delayed in phase with respect to the reflected radiation originating from the first transition. Destructive interference then occurs between the reflected radiation parts, so that the reflected beam extinguishes, in other words, the reflection of the lens surface plus anti-reflection coating is equal to zero.

As is known, said phase difference is dependent on the wavelength of the beam b. Since the angle of incidence determines the path length covered by a ray or a beam portion in the anti-reflection coating, the phase difference is also dependent on the angle of incidence. Consequently, the destructive interference is only complete for a given wavelength and a given angle of incidence. For the present invention, only the dependence of the angle of incidence is important. This angle dependence becomes particularly manifest in the border rays or border portions of the beam, because their angles of incidence are larger than those of the rays or beam portions which extend close to or along the optical axis. If, as is common practice, the anti-reflection coating is designed for an angle of incidence which is equal to zero, hence for a beam portion extending along the optical axis, this coating is less and less effective for beam portions which are at an increasing distance from the optical axis. For the beam portions which are at an increasing distance from the optical axis, an increasing portion is reflected and a decreasing portion is passed. This means that the beam exiting from the lens element no longer has a uniform intensity.

Figure 2:
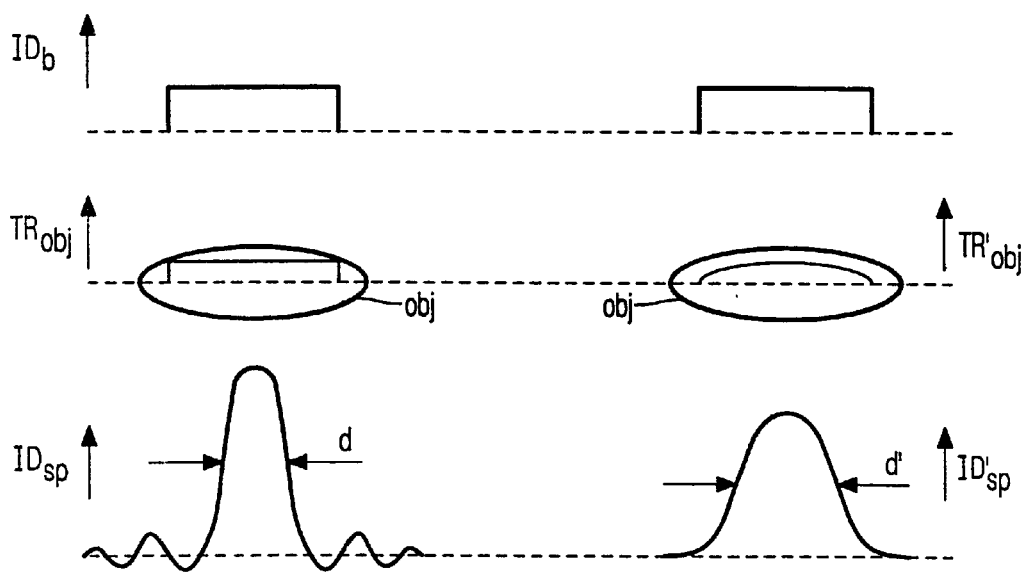
FIG. 2 shows the effect of the different angles of incidence on the intensity distribution within the beam.

When using the lens element as a read objective or as a part of such an objective in a scanning device for optical record carriers, the radiation spot formed with the aid of this objective no longer has the desired uniform intensity. This is illustrated in FIG. 2. In this Figure, the reference $ID_b$ denotes the intensity distribution of the beam incident on the objective Obj, $TR_{obj}$ denotes the transmission characteristic of the objective and $ID_{sp}$ denotes the intensity distribution of the scanning spot formed. It has been assumed that the incoming beam has a uniform intensity. The left-hand part of FIG. 2 shows the ideal situation. The objective has a constant transmission throughout the diameter, and the intensity of the scanning spot formed with the objective has an Airy distribution, i.e. a central lob which is as narrow and as high as possible and some side lobs which must be as low as possible. Generally, the full-width half maximum (FWHM) d is taken as a measure of the size of the spot formed, i.e. the width at that position where the intensity has decreased to half the intensity in the center. If the transmission of the objective $TR'_{obj}$ decreases from the center towards the edge, as is shown in the right-hand part of FIG. 2, i.e. if it has a Gaussian distribution, then the radiation spot formed with this objective also has a Gaussian intensity distribution $ID'_{sp}$. In principle, the FWHM d' and hence the size of the scanning spot is larger than that in the left-hand part of FIG. 2.

The extent to which the effect of the anti-reflection coating is dependent on the angle of incidence, hence the extent to which the intensity of the beam exiting from the objective is not uniform, is determined by the numerical aperture of the objective lens. In the conventional objective lenses having a numerical aperture of the order of 0.45, the effect is negligible. For future objective lenses having a larger numerical aperture, for example of the order of 0.85, at which angles of incidence up to 40° and more may occur, the intensity at the border of the beam may decrease by more than 10%.

The invention provides an anti-reflection coating which does not have substantially any dependence of the angle of incidence and with which, even at higher numerical apertures, inter alia, a beam having a uniform intensity and a scanning spot with an Airy distribution can be obtained. According to the invention, the coating consists of a plurality of sub-coatings which, in their turn, may be composite coatings and consist of, for example two or three layers.

Figure 3:
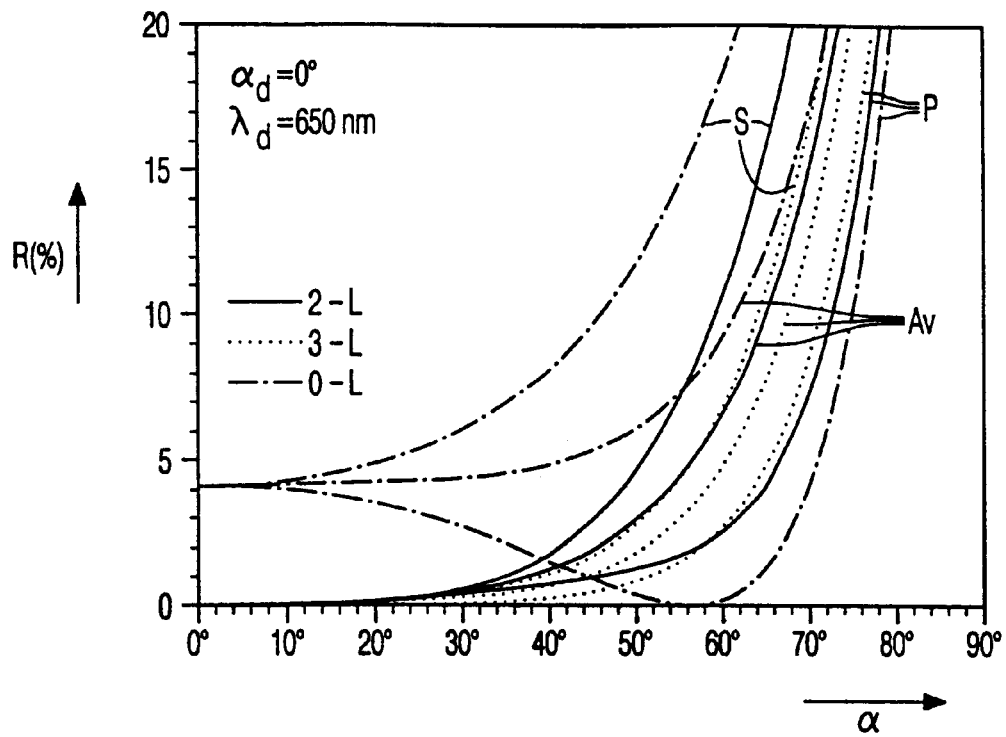
FIG. 3 shows the reflection coefficients for S and P-polarized radiation as a function of the angle of incidence for coatings having different numbers of layers and a design angle of 0°.

FIG. 3 shows the angle-of-incidence dependence of a two-layer sub-coating (2-L) and a three-layer sub-coating (3-L), both optimized for a design angle $\alpha_d$ of 0° and a design wavelength of 650 nm. The angle of incidence α is plotted on the horizontal axis and the reflection coefficient R is plotted in % on the vertical axis. For the sake of comparison, the variation of the reflection coefficient as a function of the angle of incidence for an uncoated air-glass transition (0-L) is shown. Since the polarization of the radiation will play a role for angles of incidence which are unequal to 0°, FIG. 3 shows the reflection coefficient for both the S polarization (S) and the P polarization (P), as well as the average (AV) of these reflection coefficients.

Figure 4:
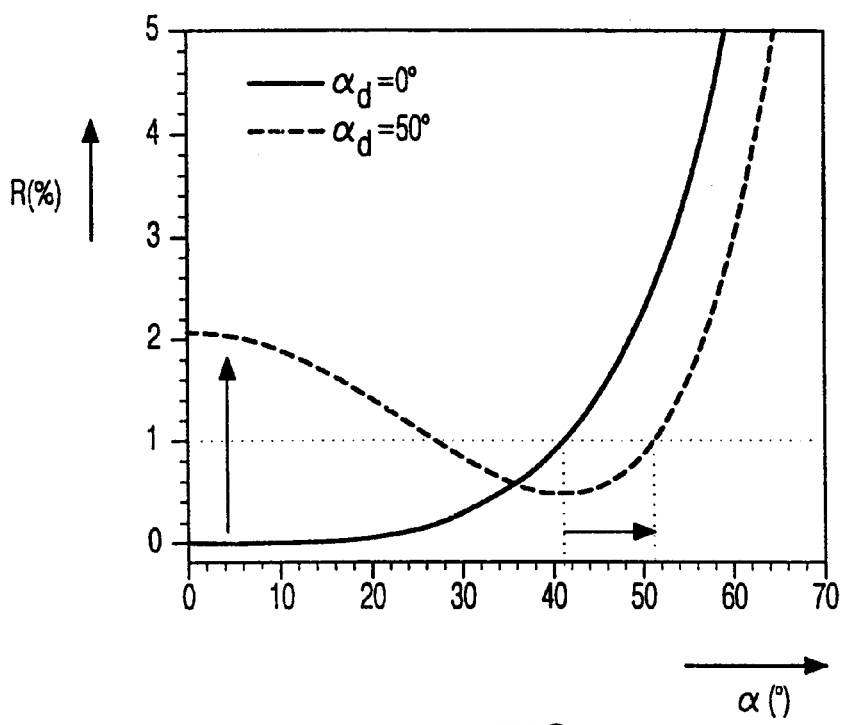
FIG. 4 shows the average reflection coefficient as a function of the angle of incidence for two different two-layer coatings with a design angle of 0° and 50°, respectively.

FIG. 4 shows the average reflection coefficient R as a function of the angle of incidence a for a first two-layer sub-coating which is optimized for a design angle of 0° and for a second two-layer sub-coating which is optimized for a design angle of 50°. As is shown in the Figure, the second sub-coating is effective for larger angles of incidence than the first sub-coating. If the limit for the maximally admissible reflection is set at 1%, the first sub-coating will be usable for angles of incidence up to 40°, while the second subcoating will be usable for angles of incidence from approximately 25° to 50°. However, the second coating is not suitable for angles of incidence which are smaller than approximately 25°.

However, a combination, according to the invention, of sub-coatings optimized for different design angles provides the possibility of adapting, as desired, the net transmission through a transition between two media, for example an air-glass transition, or through a number of these transitions.

Figure 5:
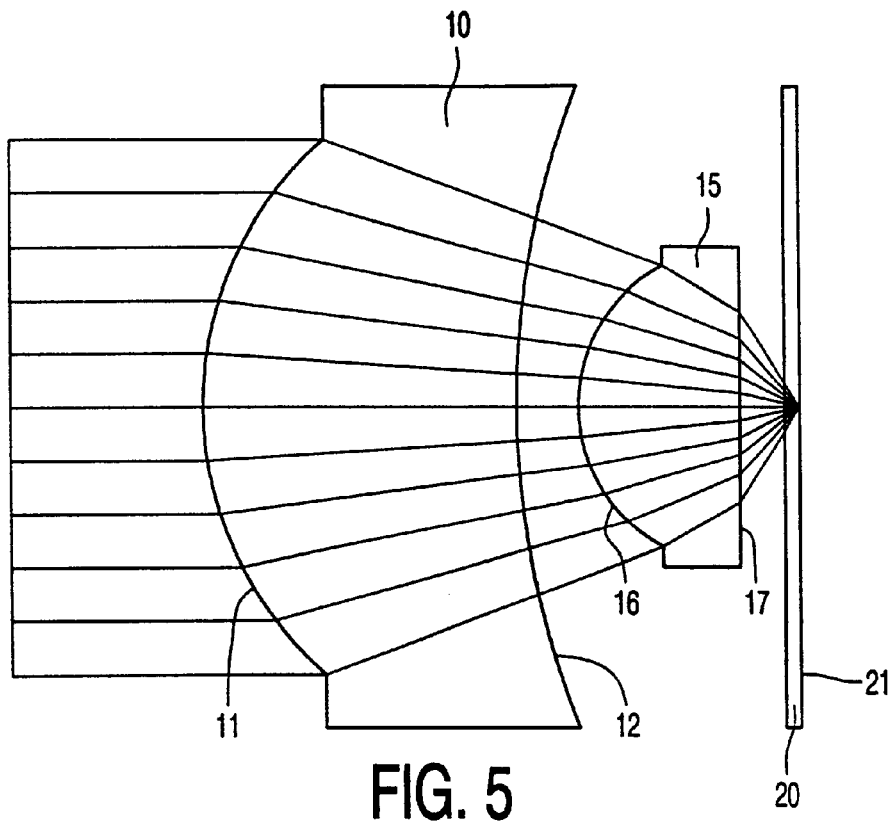
FIG. 5 shows an embodiment of a lens system having a large numerical aperture.

An example of a series of such transitions is shown in FIG. 5. This Figure shows a lens system which is intended for a scanning device for optical record carriers having a very high information density. The lens system comprises an objective lens 10, with lens surfaces 11 and 12, which converges the, for example parallel, beam b coming from the right, and a plano-convex lens 15, with lens surfaces 16 and 17, which focuses the beam to a scanning spot 25 on the information plane 21 of an optical record carrier, only the transparent substrate of which is shown. This system comprises four refractive surfaces 11, 12, 16 and 17 on which reflection may occur. If no anti-reflection coating or only a single standard anti-reflection coating optimized for a design angle of 0° is provided on the lens surfaces, the initially homogeneous beam, all rays of which have the same intensity, acquires an inhomogeneous radiation distribution after it has passed the lens system, because the rays which are further remote from the optical axis have a reduced intensity because the total transmission of the lens system is reduced for these rays. Consequently, the border intensity may decrease by more than 10%. By providing an adapted combination of sub-coatings on each of the four lens surfaces, it can be ensured that the beam is still homogeneous, even after it has passed the lens system. The transmission of the parts of the lenses further remote from the optical axis is then increased, while the transmission of the central portions of these lenses decreases to only a small extent.

When determining the suitable combinations of sub-coatings, different conditions can be imposed, for example, the condition of a minimal spread of transmission or the condition of a minimal spread and the average value of the transmission being at least 95%.

Figure 6:
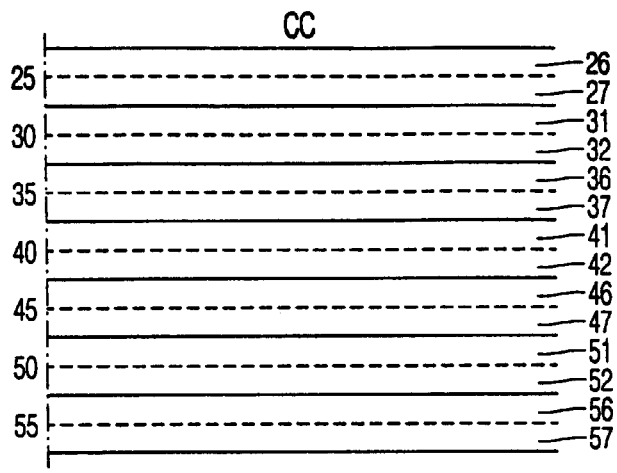
FIG. 6 shows a first embodiment of an anti-reflection coating according to the invention.

A first embodiment of an anti-reflection coating according to the invention, suitable for the lens system shown in FIG. 5 with a numerical aperture of 0.85 and for a wavelength of 650 nm, comprises a combination of seven two-layer sub-coatings whose layers consist of the known anti-reflection materials $SiO_2$ and $TiO_2$. This coating is shown in FIG. 6.

The sub-coatings are denoted by the reference numerals 25, 30, 35, 40, 45 and 50, respectively, and the layers of these sub-coatings are denoted by the reference numerals 26, 27, 31, 32, 36, 37, 41, 42, 46, 47, 51, 52, 56 and 57, respectively. The different subcoatings are optimized for design angles of 0°, 15°, 30°, 40°, 45°, 50° and 55°, respectively. In the computation, use has been made of six rays, one of which coincides with the optical axis and the others are situated at an increasing distance from this axis. The angle of incidence of each ray on each surface may be fixed by means of suitable computer programs which are known as "ray tracing" programs. Then, the coatings for the different lens surfaces can be optimized by means of similarly known, special computing programs such as those known as "TFCalc" and "FilmStat Design". The prescription for the coating, i.e. the thickness d and the refractive index n of the separate layers will thereby become available.

Figure 7:
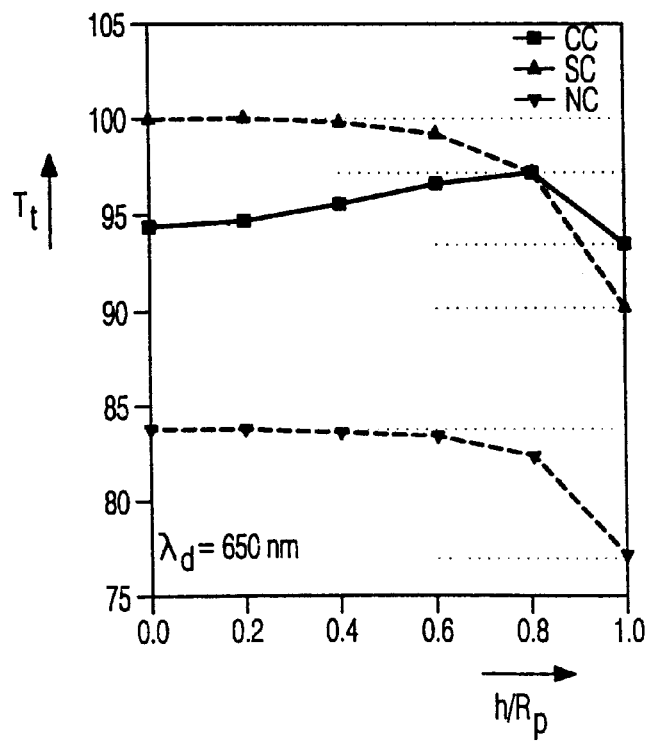
FIG. 7 shows the transmission as a function of the distance to the optical axis for the lens system of FIG. 5 for different anti-reflection coatings, inter alia, those according to the invention.

FIG. 7 shows the total transmission for the six rays of the system shown in FIG. 5, whose lens surfaces are provided with this embodiment of the anti-reflection coating (CC). The distance to the optical axis (h/Rp) normalized with the ray of the pupil is plotted on the horizontal axis, and the total transmission (Tt) is plotted on the vertical axis. For the sake of comparison, the transmission in the case of use of a standard two-layer coating with a design angle of 0° (SC) and the transmission in the case where no coating is used (NC) are also shown. It can be derived from this Figure that the standard deviation of the transmission for the different rays is 1.35% for the optimized combination coating CC, and the central transmission is 95.5%, while the transmission at the border is 93.38%. For the standard coating SC, the spread is 3.84%, the central transmission is 100% and the transmission at the border is 90.34%.

It is to be noted that this embodiment of the combination coating is only optimized for the design angle. Even better results can be obtained if three-layer sub-coatings are also provided in the new coating.

FIG. 7 shows that a more uniform transmission throughout the pupil of the lens system is accompanied by a reduced transmission in the center of the pupil. However, integrated throughout the pupil, the total passed intensity is not much less and even more for a better optimized coating than in the case where the standard coating SC would be used. The reason of this is that, since a beam having a flat wave front has its greatest intensity at its border, the decrease of the transmission at the border results in a considerable reduction of the total intensity.

Figure 8:
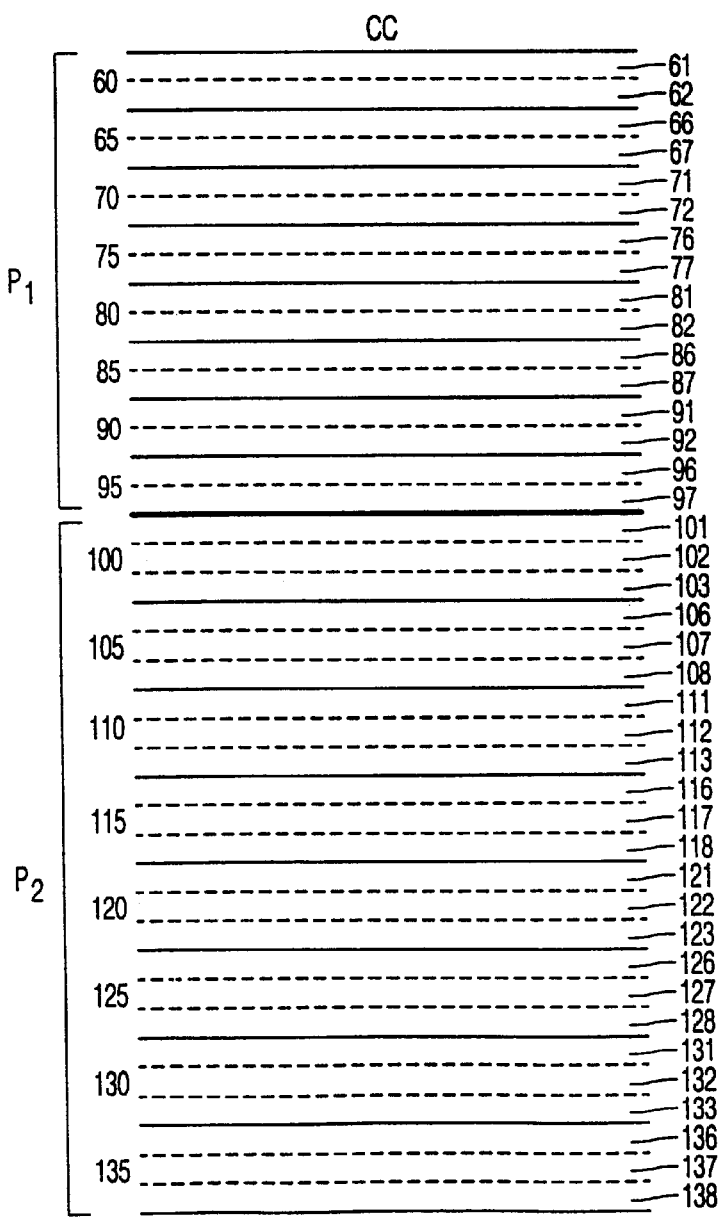
FIG. 8 shows a second embodiment of an anti-reflection coating according to the invention.

FIG. 8 shows an embodiment of the novel coating in which both two-layer sub-coatings and three-layer sub-coatings are used. The coating consists of a first stack $P_1$ of eight two-layer sub-coatings 60, 65, 70, 75, 80, 85, 90 and 95 and a second stack of three-layer sub-coatings 100, 105, 110, 115, 120, 125, 130 and 135. The layers-of the sub-coatings are denoted by separate reference numerals, for example 61 and 62 for the sub-coating 60, and 136, 137 and 138 for the sub-coating 135 so as to indicate that these layers do not only have different refractive indices but may also have different thicknesses. The layers of the two-layer sub-coatings may consist of the known anti-reflection materials $SiO_2$ and $TiO_2$ and those of the three-layer sub-coatings may consist of the similarly known anti-reflection materials $Al_2O_3$, $ZrO_2$ and $MgF_2$. The sub-coatings of both stacks are optimized for angles of incidence of 0°, 10°, 20°, 30°, 40°, 50°, 55° and 60°, respectively.

Figure 9:
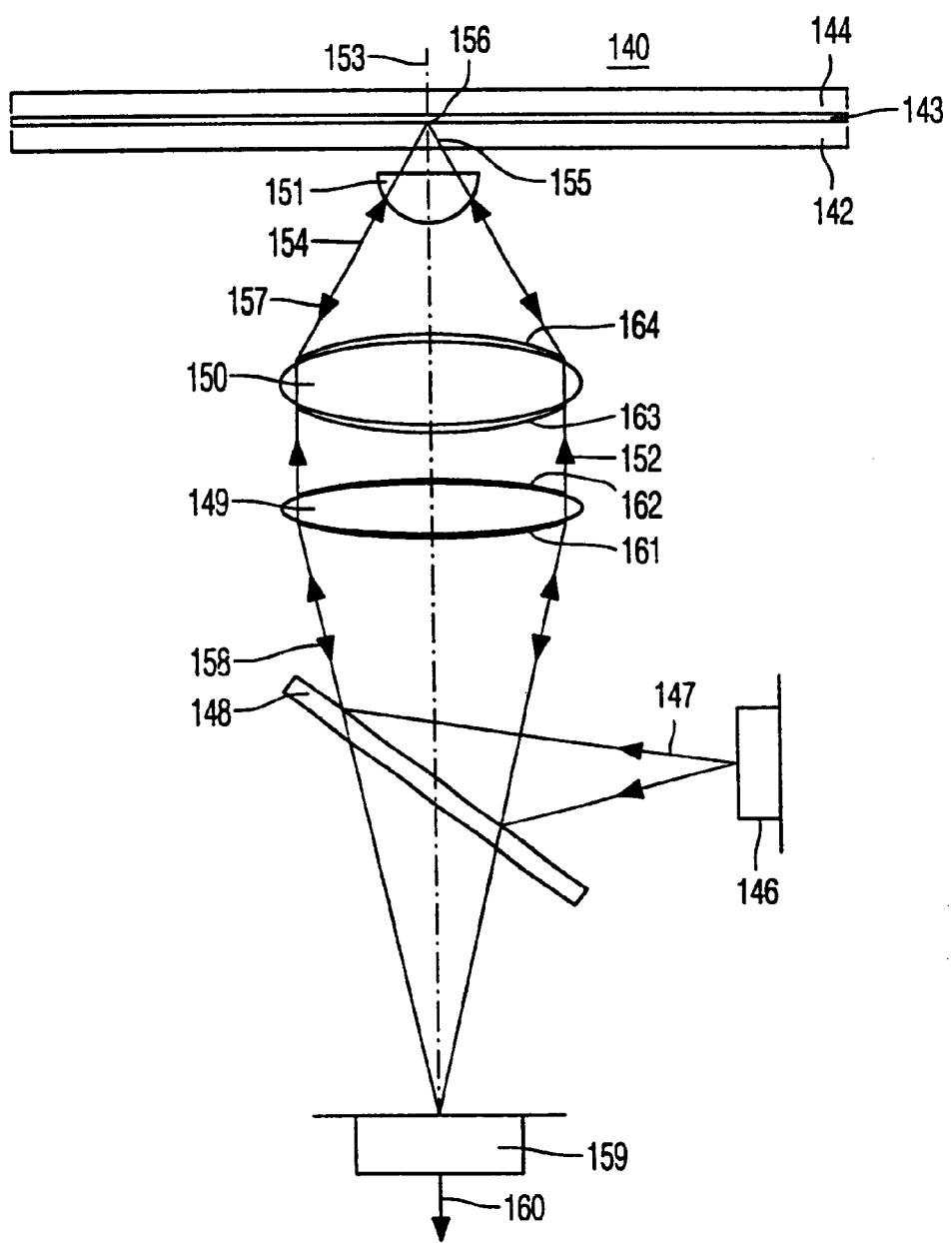
FIG. 9 shows an embodiment of a scanning device for optical record carriers, in which the invention is used.

FIG. 9 shows an embodiment of a scanning device for an optical record carrier 140, in which device the invention may be used. The record carrier has a transparent substrate 142 which is provided with an information layer 143. A protection layer 144 for protecting the information layer from ambient influences may be provided on the side of the information layer remote from the substrate. In the information layer, the information is stored in optically detectable information elements which are arranged in parallel tracks or in a spiral track. The information elements may have any optically detectable shape and consist of, for example pits or areas with a reflection coefficient or direction of magnetization which is different from their surroundings.

The scanning device comprises a radiation source 146, for example a semiconductor laser which emits a diverging scanning beam 147. This beam is reflected to a lens system by a beam splitter 148 in the form of, for example a semitransmissive plate. This lens system comprises a collimator lens 149, an objective lens 150 and a plano-convex lens 151. The collimator lens changes the diverging beam to a parallel beam 152. This beam and the objective lens 150 and the plano-convex lens 151 correspond to the beam b and the lenses 10 and 15 in FIG. 5. The objective lens 150, which has an optical axis 153, changes the parallel beam 152 to a converging beam 154 which is incident on the lens 151. The collimator lens 149 and the objective lens may be combined to one lens. The plano-convex lens changes the beam 154 incident thereon to a converging beam 155 which is focused on the information layer 143. The flat side of the piano-convex lens 151 faces the transparent substrate so that there is a gap between this lens and the substrate. Although the objective lens is shown in the Figure as a single lens element, it may consist of a plurality of lens elements. Radiation of the converging beam 155, reflected by the information layer 143, constitutes a reflected beam 157 which returns along the path of the on-going beam 154. The objective lens 150 and the collimator lens 149 change the beam 157 to a converging reflected beam 158, and the beam splitter 148 passes a part of this beam to a detection system 159. This system converts the radiation modulated by the information layer into an information signal 160 which represents the information read.

The surfaces of the lenses 150 and 151 are provided with anti-reflection coatings 161, 162, 163 and 164 having a composition as described hereinbefore.

Such a coating may not only be provided on the lens surfaces but also on surfaces of other elements of the device, notably on those surfaces where the beam has a large aperture angle. An example is the beam splitter 148 which is arranged at an angle of 45° in the beam. Due to this orientation, the angle of incidence of the different rays of the beam has a large variation, so that also the beam reflected by the beam splitter can acquire a non-uniform intensity. This can be prevented by providing an anti-reflection coating as described above on the beam splitter.

As is apparent from FIG. 9, the scanning beam 155 has a large aperture angle at the area of the transition between air and the transparent substrate 142 so that angles of incidence of the order of 40° or more may also occur at that area. The problem of a reduced border intensity due to reflections then also occurs at this transition. This problem can be solved by providing an anti-reflection coating according to the invention also at this transition, which involves another use of the invention.

However, a different solution of this problem is preferred. This solution consists of the adaptation of the transmission properties of the lens system. By ensuring, via a suitable choice of the combination of anti-reflection coatings on the lens surfaces, that the transmission of the lens system for the border of the beam is extra increased, it is possible to compensate for the reduced border transmission at the transition between air and the substrate.

The invention may not only be used in a scanning device for optical record carriers, but also in numerous other apparatuses and for numerous other elements. Examples are its use in a projection lens in a lithographic projection apparatus with which a mask pattern, for example an IC pattern can be repetitively imaged on a substrate. To be able to image details of minimal size on the substrate, the projection lens must have a maximal aperture so that the rays of the projection beam can also be incident at very different angles on the surfaces of the large number of lens elements in such a projection system. Also in these apparatuses, it can be prevented by means of the invention that the projection beam acquires a non-uniform intensity distribution due to these different angles of incidence. Numerous embodiments of the lithographic projection apparatus and the lithographic projection lens are known. By way of example, reference is made to U.S. Pat. No. 4,778,275 for a description of a lithographic projection apparatus and to EP-A 0 770 895 for a description of a projection lens.

The invention may generally be used in optical systems in which high numerical apertures are required or desired.

The concept of the invention may be alternatively used for optimizing parameters other than the transmission in optical systems. An example is the optical phase of a beam after it has passed the optical system. Since a piece of optical path length is added due to the provision of, for example a standard anti-reflection coating on the surface of an optical element, a phase shift within the beam may occur which is dependent on the angle of incidence. This phase shift can be computed so that a composite coating can be designed which compensates for this phase difference.

The use of the invention is not limited to systems having a high numerical aperture, but may be alternatively used for minimizing side effects in systems having a lower numerical aperture. For example, a problem in providing coatings is that the thickness of a sputtered or vapor-deposited layer decreases as the normal on the surface to be coated extends at a larger angle to the direction of the sputtering or vapor-deposition flux. For an anti-reflection coating, a variation of the layer thickness involves a variation of the reflection properties. This problem may notably occur in a high numerical aperture lens system for reading optical discs, because the convex surface of the plano-convex lens even has the shape of a hemisphere in this case. This effect of the vapor-deposition process or sputtering process may be compensated by an adapted embodiment of the composite coating according to the invention.

When designing a scanning device for an optical record carrier with a very high information density, in which scanning device a scanning beam having a wavelength in the blue range of the spectrum and an objective system having a high numerical aperture are used, the aim is to render this device also suitable for scanning the current optical record carriers having a lower information density, so that compatibility is achieved. However, the last-mentioned record carriers are designed to be scanned with a red laser beam and an objective lens having a smaller numerical aperture. To render the scanning device for record carriers with a high density suitable for scanning record carriers with a smaller density, it may be provided with a laser emitting blue radiation as well as a laser emitting red radiation. However, the numerical aperture of the lens system of this device must be smaller for the red radiation than that for the blue radiation. According to the invention, this can be realized by providing the lens surfaces of the lens system having the high numerical aperture with a coating which is color-selective at the edges, i.e. it passes blue radiation only. The desired compatibility can then be realized without changing the numerical aperture.

What is claimed is:

1. An optical system, comprising:
   a first medium and a second medium, each with different optical properties and separated by a transition boundary;
   an anti-reflective coating provided at the transition boundary to reduce reflection of electromagnetic radiation incident to the transition boundary, the coating including multiple sub-coatings, each sub-coating having a maximum anti-reflectance at a respective angle of incidence of the radiation for a particular wavelength of the radiation, the sub-coatings including sub-coatings with maximum anti-reflectance at different respective angles of incidence, the thickness of the sub-coatings providing a more uniform distribution of intensity and a higher average intensity than would be provided by a single anti-reflective layer.

2. The system of claim 1, in which the sub-coatings include sub-coatings with at least two layers of different respective materials.

3. The system of claim 2, in which the coating includes a stack of seven two-layer sub-coatings and the sub-coatings each have an anti-reflectance which is a maximum at angles of incidence of 0°, 15°, 30°, 40°, 45°, 50° and 55° respectively.

4. The system of claim 1 comprising:
   a lens system including at least one lens element with two lens surfaces which define transition boundaries between different materials and are each provided with the coating.

5. The system of claim 4, in which the lens system is a lithographic projection system suitable for guiding and converging a UV projection beam.

6. The system of claim 4, in which the lens system includes an objective lens and a plano-convex lens whose convex surface faces the objective lens. of a different respective material.

7. The system of claim 1 in which the transition boundary is both more uniform across the beam and of higher average intensity than would be provided by a coating having only a single anti-reflective layer with an anti-reflectance that is maximum at an angel of incidence of 0°.

8. An optical system comprising:
   a first medium and a second medium, each with different optical properties and separated by a transition boundary;
   an anti-reflective coating provided at the transition boundary to reduce reflection of electromagnetic radiation incident to the transition boundary. the coating including multiple sub-coatings, each sub-coating having a maximum anti-reflectance at a respective angle of incidence of the radiation for a particular wavelength of the radiation, the sub-coatings including sub-coatings with maximum anti-reflectance at different respective angles of incidence;
   and in which the coating includes a combination of two-layer sub-coatings and three-layer sub-coatings each of the three layers of a different respective material.

9. The system of claim 8, in which the coating includes a first stack of two-layer sub-coatings and a second stack of three-layer sub-coatings.

10. The system of claim 9, in which the first and the second stack each include eight sub-coatings which are maximally anti-reflective for angles of incidence of 0°, 10°, 20°, 30°, 40°, 50°, 55° and 60°, respectively.

11. A lithographic projection apparatus comprising:
a UV radiation source for supplying a projection beam;
a mask holder for supporting a mask to be projected by the beam;
a substrate holder for supporting a substrate on which the mask is to be projected; and
a lithographic projection system arranged between the mask holder and the substrate holder for guiding the uv projection beam and including a lens element with a lens surface provided with an anti-reflective coating including multiple sub-coatings each sub-coating having a maximum anti-reflectance at a respective angle of incidence of the radiation, the sub-coatings including sub-coatings with maximum anti-reflectance at different respective angles of incidence.

12. an optical scanning device for scanning an optical record carrier comprising:
a radiation source for supplying a scanning beam;
a lens system for converging the scanning beam through a transparent substrate to form a scanning spot on an information layer on a surface of the substrate, including a plano-convex lens with the flat side facing the substrate;
an anti-reflective coating provided on the flat surface of the plano-convex lens to reduce reflection of electromagnetic radiation incident to the surface. the coating including multiple sub-coatings. each sub-coating having a maximum anti-reflectance at a respective angle of incidence of the radiation for a particular wavelength of the radiation, the sub-coatings including sub-coatings with maximum anti-reflectance at different respective angles of incidence.

13. An optical system, comprising:

a first medium and a second medium, each with different optical properties and separated by a transition boundary;

an anti-reflective coating provided at the transition boundary to reduce reflection of electromagnetic radiation incident to the transition boundary, the coating including multiple sub-coatings, each sub-coating having a maximum anti-reflectance at a respective angle of incidence of the radiation for a particular wavelength of the radiation, the sub-coatings including sub-coatings with different respective angles of incidence for maximum anti-reflectance, the thickness of the sub-coatings compensating for the effect of variations in layer thickness due to manufacturing processes on a beam of radiation as it passes through the transition boundary.

* * * * *